(12) United States Patent
Yamazaki

(10) Patent No.: US 7,164,504 B1
(45) Date of Patent: Jan. 16, 2007

(54) IMAGE PROCESSING APPARATUS, IMAGE PROCESSING METHOD AND COMPUTER PROGRAM PRODUCT FOR IMAGE PROCESSING

(75) Inventor: Tsutomu Yamazaki, Sagamihara (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/568,669

(22) Filed: May 11, 2000

(30) Foreign Application Priority Data

May 20, 1999 (JP) ................... 11-140584

(51) Int. Cl.
*H04N 1/405* (2006.01)

(52) U.S. Cl. ..................... 358/3.08; 358/3.14

(58) Field of Classification Search ...... 358/3.03–3.08, 358/3.13–3.15; 382/260–269, 199–200, 382/176
See application file for complete search history.

(56) References Cited

U.S. PATENT DOCUMENTS

| | | | | |
|---|---|---|---|---|
| 4,969,053 A | * | 11/1990 | Outa et al. | 348/104 |
| 5,231,677 A | | 7/1993 | Mita et al. | 382/22 |
| 5,331,442 A | * | 7/1994 | Sorimachi | 358/532 |
| 5,361,141 A | * | 11/1994 | Aoyama | 358/452 |
| 5,687,006 A | * | 11/1997 | Namizuka et al. | 358/462 |
| 5,825,937 A | * | 10/1998 | Ohuchi et al. | 382/261 |
| 5,884,296 A | * | 3/1999 | Nakamura et al. | 706/20 |
| 6,111,982 A | * | 8/2000 | Adachi | 382/176 |
| 6,519,056 B1 | * | 2/2003 | Hattori | 358/3.09 |
| 2002/0126315 A1 | * | 9/2002 | Nabeshima | 358/3.03 |
| 2002/0181024 A1 | * | 12/2002 | Morimoto et al. | 358/3.15 |

FOREIGN PATENT DOCUMENTS

| JP | 61-157162 A | 7/1986 |
|---|---|---|
| JP | 11-103392 A | 4/1999 |

\* cited by examiner

*Primary Examiner*—Thomas D. Lee
*Assistant Examiner*—Stephen Brinich
(74) *Attorney, Agent, or Firm*—Sidley Austin LLP

(57) ABSTRACT

An image processing apparatus processes image data which is obtained by reading an halftone dot image. In the image processing apparatus, the image data is separated into the image data corresponding to halftone dots which form the halftone dot image and other image data. On the image data corresponding the halftone dots, the smoothing process is performed, and on the other image data, the edge enhancement is performed. Both of image data are synthesized and outputted. Since only the separated image data corresponding to halftone dots are smoothed out, it is possible to suppress creation of a moiré due to the halftone dot image which is an aggregation of the halftone dots, without influencing the smoothing processing upon the character portion in the vicinity of the halftone dots. On the other hand, since the other image data are edge-enhanced, the character portion, a line and the like show sharp and legible.

7 Claims, 5 Drawing Sheets

FIG. 2

| | | | | |
|---|---|---|---|---|
| i | i | i | i | i |
| i | i | i | i | i |
| i | i | P0 | i | i |
| i | i | i | i | i |
| i | i | i | i | i |

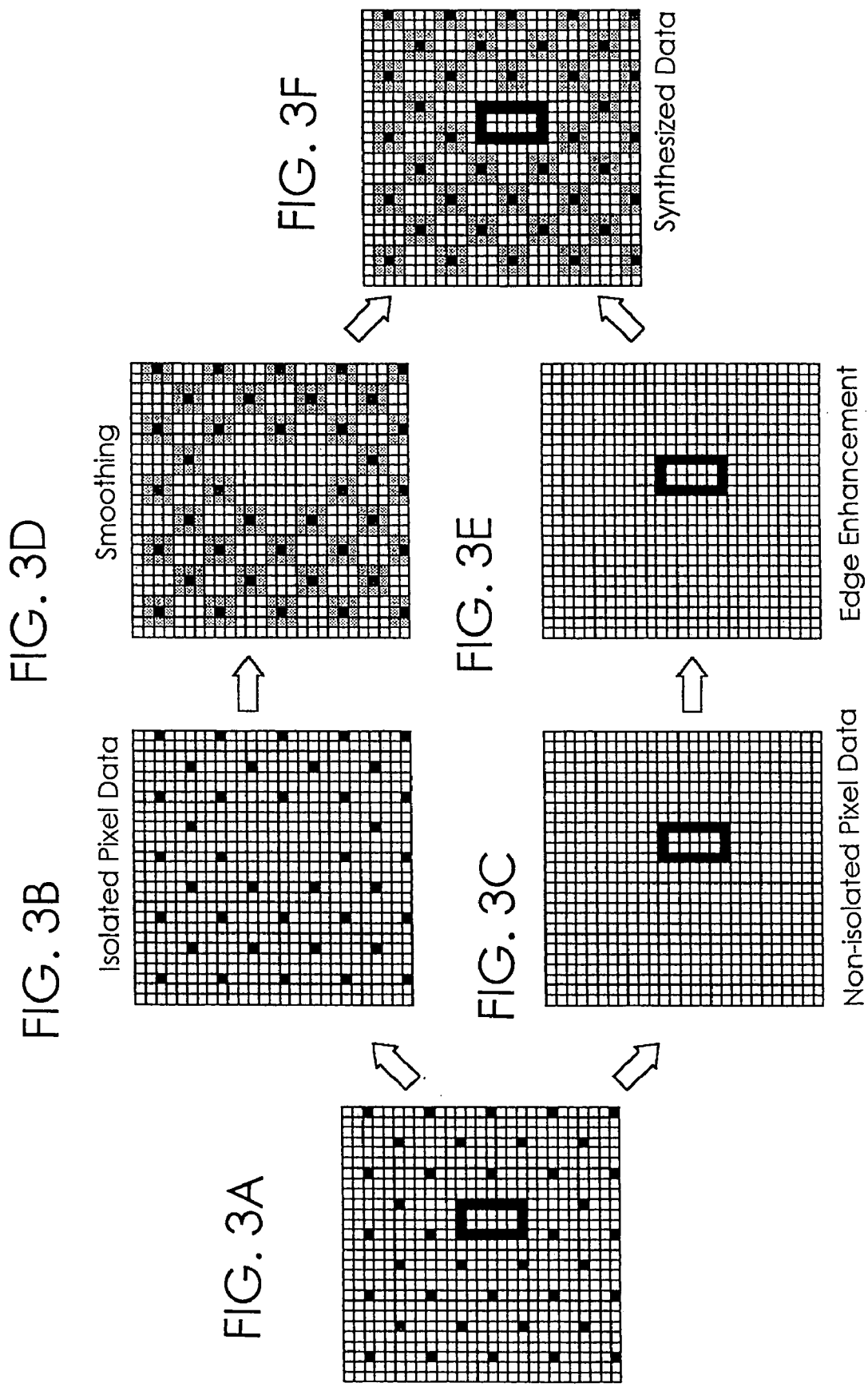

Original Image Data

Non-isolated Pixel Data after Edge Enhancement

Isolated Pixel Data after Smoothing

Image Data smoothed out and Edge-enhanced with Separation and without Separation

IMAGE PROCESSING APPARATUS, IMAGE PROCESSING METHOD AND COMPUTER PROGRAM PRODUCT FOR IMAGE PROCESSING

This application is based on application No. 11-140584 filed in Japan, the contents of which is hereby incorporated by reference.

BACKGROUND OF THE INVENTION

1. Field of the Invention

The present invention relates to an image processing apparatus, an image processing method and a computer program product for image processing, and more particularly, to those used for correction of a character, a thin line and the like which are present in a halftone dot area.

2. Description of the Related Art

Planographic printing, letterpress printing and intaglio printing customarily use a halftone method to reproduce a gray scale image which has various tints ranging from highlight to shadow. A halftone method is a method which requires to divide a gray scale image into groups of fine elements to reproduce a gray scale in accordance with an area size of fine elements. Various types of forms are actually used as fine elements which constitute halftone. Usually, as in the case of a gray scale image which is used in newspapers, etc., fine elements are fine points, namely, halftone dots, which are arranged with regularity in the form of a matrix at certain pitches in two directions which are perpendicular to each other. In the following, an image reproduced by a halftone method will be referred to as a halftone dot image, and fine elements which form a halftone dot image will be referred to as halftone dots.

When a halftone dot image which is used frequently in printed media is read with an image reader and outputted using a printer, a moiré is generated which has a dependency on a relationship between a spatial frequency of halftone dots and a reading cycle. Further, when image data obtained by reading a halftone dot image are processed through dithering, a moiré is generated which has a dependency on a relationship between a spatial frequency of halftone dots and a dither pattern cycle during the dither processing.

To prevent a moiré generated in such a manner, a conventional digital copier apparatus detects a halftone dot area in an original and smoothes out image data representing the halftone dot area so that halftone dots become indistinctive.

However, when there is a character within a halftone dot area of a print, a conventional digital copier apparatus smoothes out image data which represent the character as well. Hence, the conventional digital copier apparatus can not clearly reproduce the character which belongs to the halftone dot area. Conversely, if the conventional copier apparatus performs edge enhancement on the image data in an effort to clearly reproduce the character which belongs to the halftone dot area, the conventional digital copier apparatus ends up in enhancing even an edge of the halftone dots. This not only fails to prevent a moiré but results in a deterioration in an image quality as well.

OBJECTS AND SUMMARY

An object of the present invention is to provide an improved image processing apparatus, an improved image processing method and an improved computer program product for image processing.

Another object of the present invention is to provide an image processing apparatus, an image processing method and a computer program product for image processing, with which it is possible to desirably process image data which are obtained by reading a halftone dot image.

A yet another object of the present invention is to provide an image processing apparatus, an image processing method and a computer program product for image processing, with which it is possible to prevent a moiré which depends on a spatial frequency of halftone dots while clearly reproducing a character which belongs to a halftone dot area.

To achieve the objects above and other objects, according to one aspect of the present invention, an image processing apparatus is structured as an apparatus which processes image data which are obtained by reading a halftone dot image, and comprises a detector for detecting image data which correspond to halftone dots which form the halftone dot image and a smoothing processor for smoothing out image data which are detected by the detector.

According to other aspect of the present invention, the image processing apparatus above further comprises a separator which separates the image data into image data which correspond to halftone dots and other image data based on a result of the detection performed by the detector and supplies the image data corresponding to the halftone dots to the smoothing processor, an edge enhancement processor which receives the other image data and performs edge enhancement on the other image data, and a synthesizer which synthesizes image data outputted from the smoothing processor and image data outputted from the edge enhancement processor.

According to other aspect of the present invention, an image processing method is structured as a method which processes image data which are obtained by reading a halftone dot image, and comprises a step of detecting image data which correspond to halftone dots which form the halftone dot image and a step of smoothing out of the image data which are detected at the detecting step.

According to other aspect of the present invention, the image processing method above further comprises a step of separating the image data above into image data which correspond to halftone dots and other image data based on a result of the detection performed in the detecting step, a step of receiving the other image data and performing edge enhancement on the other image data, and a step of synthesizing image data outputted at the smoothing process and image data outputted at the edge enhancement process.

According to other aspect of the present invention, a computer program product for image processing is to process image data which are obtained by reading a halftone dot image, and comprises detection control for detecting image data which correspond to halftone dots which form the halftone dot image and smoothing control for smoothing out the image data which are detected by the detection control described above.

According to other aspect of the present invention, the computer program product above further comprises separation control for separating the image data above into image data which correspond to halftone dots and other image data based on a result of the detection performed by the detection control and supplying the image data corresponding to the halftone dots to the smoothing control, edge enhancement control for receiving the other image data and performing edge enhancement on the other image data, and synthesis control for synthesizing image data outputted from the smoothing control and image data outputted from the edge enhancement control.

BRIEF DESCRIPTION OF THE DRAWINGS

These and other objects and features of the present invention will become apparent from the following description of preferred embodiments thereof taken in conjunction with the accompanying drawings, in which:

FIG. 2 is a schematic diagram of an isolated pixel filter which is used in an isolated pixel detection part of the image processing part above;

FIGS. 3A, 3B, 3C, 3D, 3E and 3F are schematic diagrams showing image processing performed by the image processing part above;

In the following description, like parts are designated by like reference numbers throughout the several drawings.

DETAILED DESCRIPTION OF THE PREFERRED EMBODIMENTS

Figure 1:
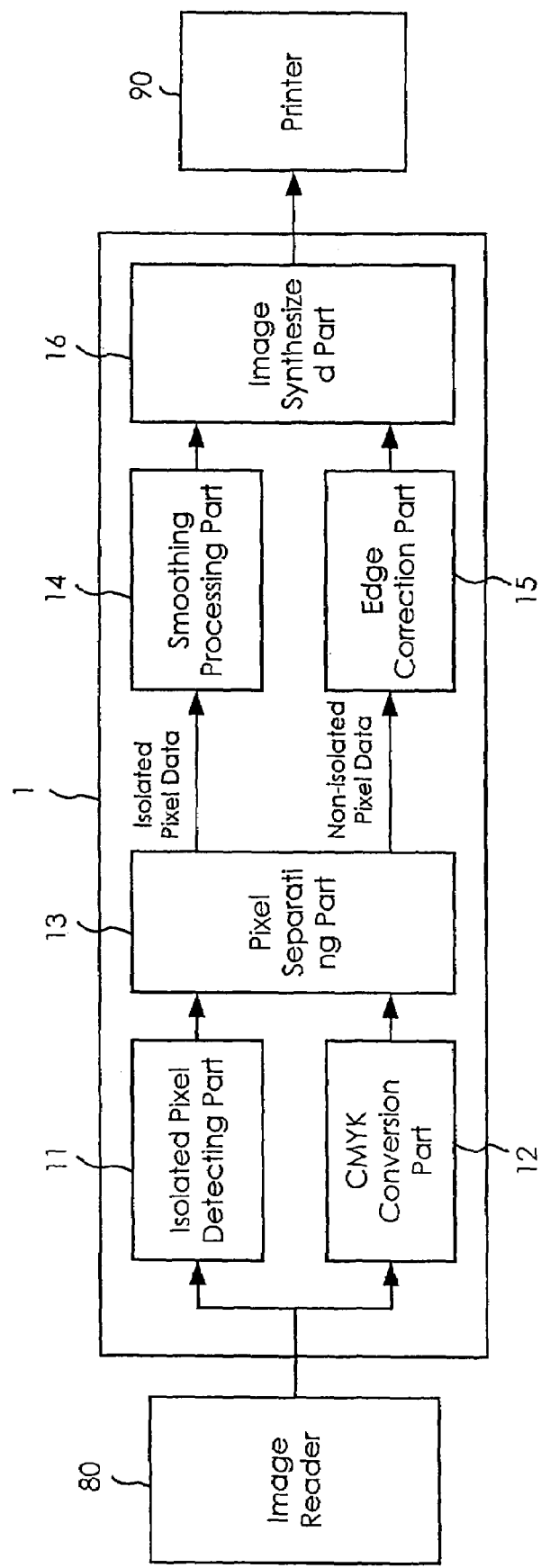
FIG. 1 is a block diagram showing a structure of an image processing part of a digital copier apparatus.

FIG. 1 is a block diagram showing a structure of an image processing part of a digital copier apparatus. Since a basic control circuit and a mechanical structure of the digital copier apparatus are similar to those of a conventional digital copier apparatus, and therefore, will not be described.

Now, an operation of image processing will be described along a flow of image data, with reference to FIG. 1. In FIG. 1, denoted at 80 is an image reader. A CCD line sensor reads an original which is placed on a platen glass, and image data representing red (R), green (G) and blue (B) are outputted. The image data are 8-bit digital signals representing each pixel in each color. An isolated pixel detecting part 11 and a CMYK conversion part 12 of an image processing part 1 receive the image data in the respective colors of RGB. The isolated pixel detecting part 11 detects an isolated pixel contained in the image data. The CMYK conversion part 12 converts the image data in the respective colors of RGB into image data in printing colors of cyan (C), magenta (M), yellow (Y) and black (K) which are used by a printer which will be described later.

Detection of an isolated pixel by the isolated pixel detecting part 11 will now be described. First, the inputted RBG image data representing the respective pixels are converted into brightness data. The brightness data V are calculated in accordance with the formula below:

$$V = k1 \times R + k2 \times G + k3 \times B \quad (1)$$

where R, G and B denote image data in the respective colors of red, green and blue, while k1, k2 and k3 are constants.

Figure 2:
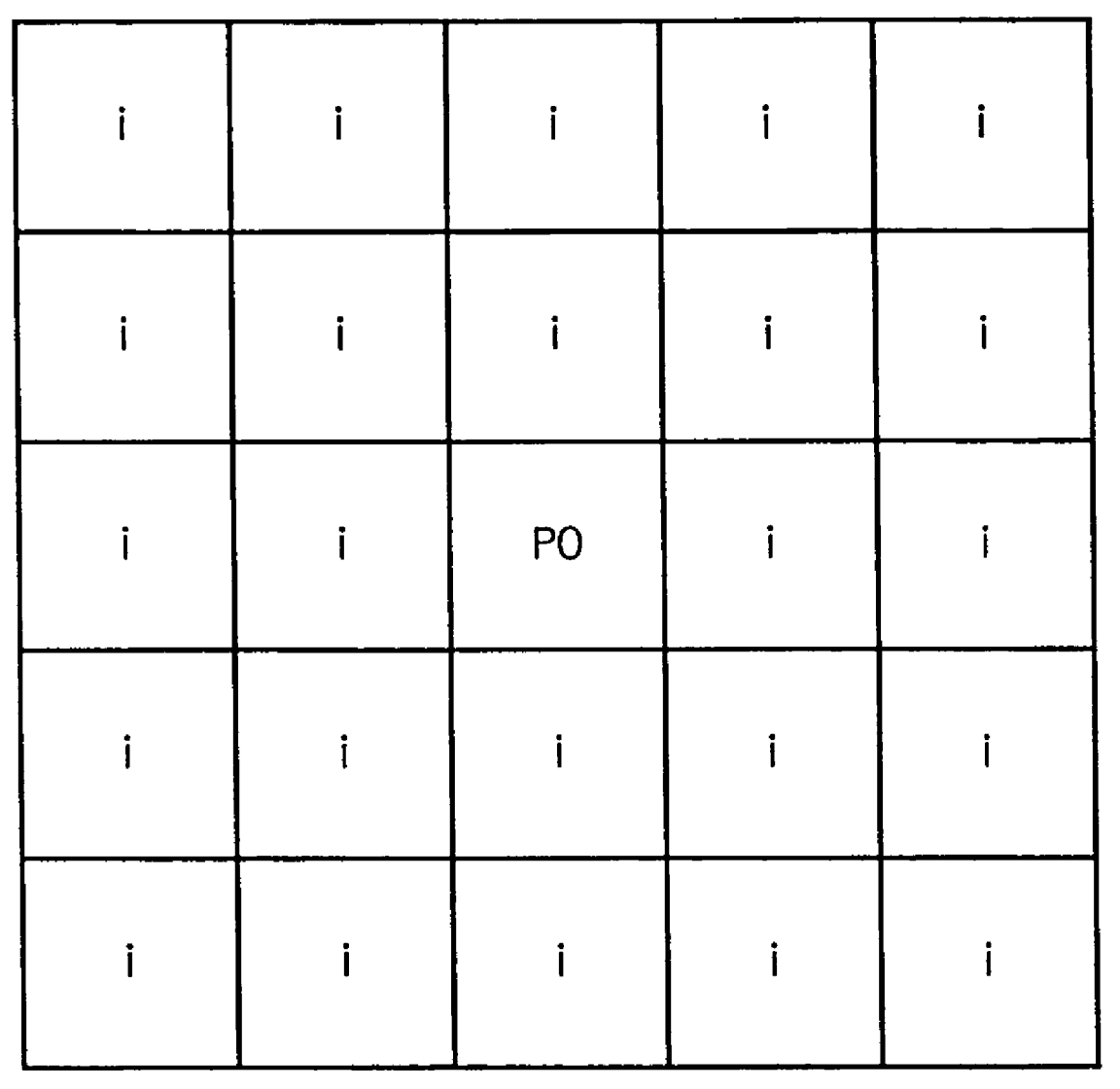

Based on the brightness data V calculated in this manner, whether the pixels of the image data are each an isolated pixel which belongs to the halftone dots which form the halftone dot image is judged using a 5×5 isolated pixel filter which is shown in FIG. 2. More specifically, the filter has a configuration which regards P0 a subject pixel and determines that the subject pixel is an isolated pixel when brightness levels of all surrounding pixels around the subject pixel are higher than a brightness level of the subject pixel by a certain value (V1) or more, as shown in the inequality (2) below:

$$\text{(Brightness of Surrounding Pixels} - \text{Brightness of Subject Pixel)} > V1 \quad (2)$$

The example described here is where the halftone dots forming the halftone dot image each have a size corresponding to one pixel of the image reader 80. However, when each halftone dot has a size corresponding to 2×2 pixels, for example, the size of the isolated pixel filter may be enlarged so that with respect to a subject pixel located at the center of the filter, pixels around the subject pixel each with one pixel interposed in-between are regarded as surrounding pixels, and whether the subject pixel is an isolated pixel is determined based on a difference in brightness between the surrounding pixels and the subject pixel. As clearly understood from the foregoing, the size of the isolated pixel filter is properly determined depending on an arrangement pitch and the size of the halftone dots of the halftone dot image.

A detection result obtained by the isolated pixel detecting part 11 is supplied to a pixel separating part 13. The pixel separating part 13, based on the detection result regarding the isolated pixels, separates the image data in the respective colors of C, M, Y and K into image data which correspond to the isolated pixels (hereinafter referred to as "isolated pixel data") and image data which correspond to the other pixels (hereinafter referred to as "non-isolated pixel data").

The separated isolated pixel data are supplied to a smoothing processing part 14 so that the data are smoothed out using a smoothing filter. On the other hand, the non-isolated pixel data are supplied to an edge correction part 15 so that an edge in the data is detected using a primary or secondary differential filter, and a detected edge portion is edge-enhanced.

The isolated pixel data and the non-isolated pixel data processed by the respective image processing are fed to an image synthesizing part 16 and synthesized into one piece of image data. Following this, as in the case of a conventional digital copier apparatus, the synthesized image data are outputted to a printer 90 which will thereafter print an image on a paper in accordance with the synthesized image data.

Now, the processing above will be described in relation to specific examples shown in FIGS. 3A through 3F. FIG. 3A schematically shows the image data representing the halftone dot image which is obtained as the image reader 80 reads the original. Each one of the cells arranged in the form of a matrix in FIG. 3A denotes each pixel of the image data, and scattered black cells denote the isolated pixels which belong to the halftone dots. The black cells contiguous to each other in the form of rings in FIG. 3A denote pixel which correspond to characters "O" which appear in the halftone dot image. In the following, what is shown in FIG. 3A will be referred to as original image data which are read by the image reader 80. The original image data are separated into the isolated pixel data and the non-isolated pixel data as shown in FIGS. 3B and 3C.

As a result of smoothing of the isolated pixel data as shown in FIG. 3B, densities at the respective black dots disperse into surrounding points. On the other hand, processed by edge enhancement, the rectangle in the non-isolated pixel data shown in FIG. 3C becomes a clearer image as that shown in FIG. 3E. As these image data are synthesized with each other, the halftone dot area is smoothed out as shown in FIG. 3F, whereby the characters and the like show as legible enhanced images which are easy to look at.

Now, the processing above will be described with reference to density data shown in FIGS. 4A through 4D. In FIGS. 4A through 4D, the vertical axes represent values (density levels) of image data at the respective pixels, and the horizontal axes represent the location of pixels of one line in a predetermined direction.

Figure 4A:
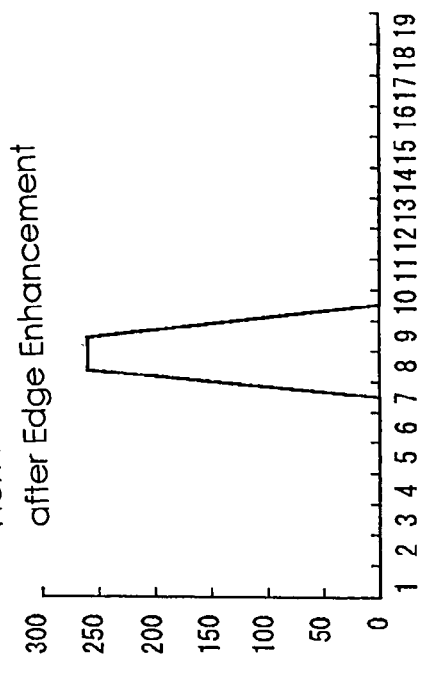
FIGS. 4A, 4B, 4C and 4D are density graphs showing image processing performed by the image processing part above.
Figure 4C:
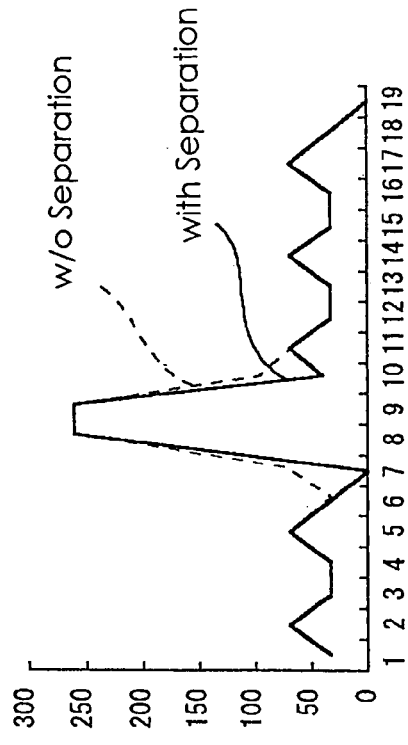
Figure 4B:
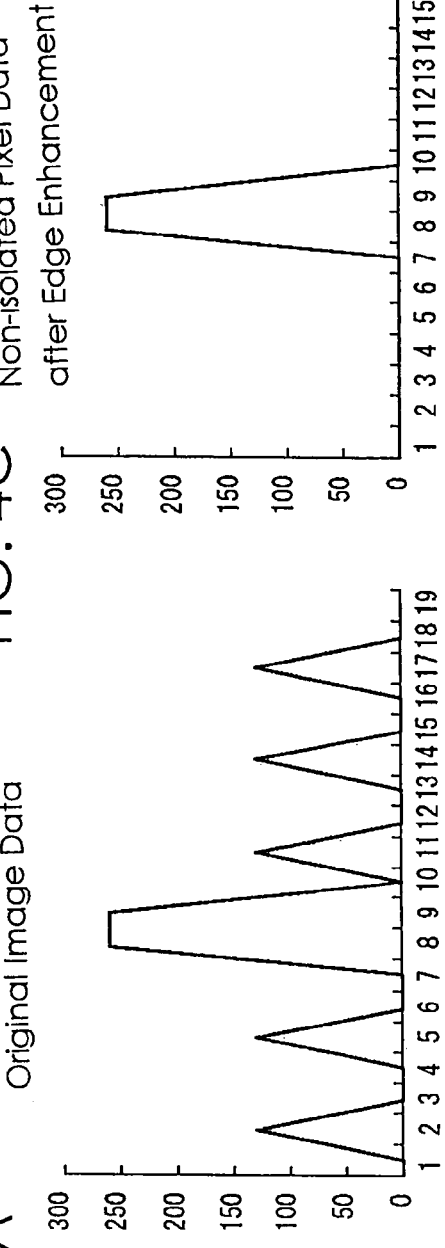
Figure 4D:
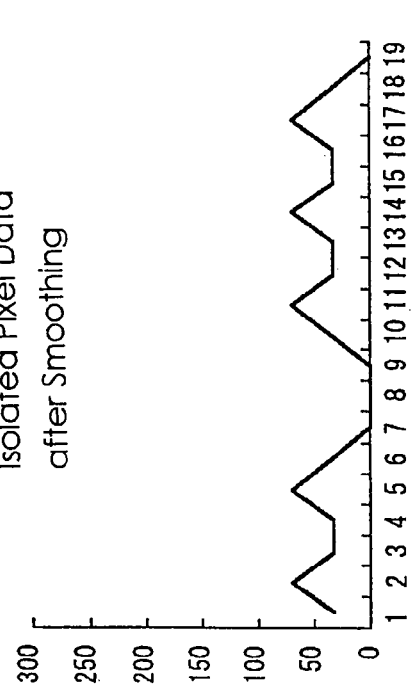

FIG. 4A shows the original image data, in which a portion of a character appears at the eighth and the ninth pixels while halftone dots appear at the second, the fifth, the eleventh, the fourteenth and the seventeenth pixels. The original image data are separated into the isolated pixel data and the non-isolated pixel data. FIG. 4B shows image data obtained by smoothing out the separated isolated pixel data. The second, the fifth, the eleventh, the fourteenth and the seventeenth pixels in FIG. 4B have lower density levels than in FIG. 4A and the first, the third, the fourth, the sixth, the tenth, the twelfth, the thirteenth, the fifteenth, the sixteenth and the eighteenth pixels have slightly higher density levels than in FIG. 4A, which means that the separated isolated pixel data are smoothed out. Meanwhile, FIG. 4C shows image data obtained by edge-enhancing the separated non-isolated pixel data. In FIG. 4D, denoted at the solid line is image data obtained by synthesizing the image data shown in FIG. 4B and the image data shown in FIG. 4C. For the purpose of comparison, the dotted line in FIG. 4D denotes an example where the original image data are smoothed out and edge-enhanced without separating the isolated pixel data.

In the example that the original image data are smoothed out and edge-enhanced without separating the isolated pixel data, the seventh and the tenth pixels which are on the both sides to the eight and the ninth pixels which correspond to the edge portion of the character, because of the influence of the smoothing out, have higher density levels than the original image data, and hence, the edge portion of the character is not clearly reproduced.

As described above, according to the preferred embodiment, since only the separated isolated pixel data are smoothed out, it is possible to suppress creation of a moiré due to the halftone dot image which is an aggregation of the halftone dots, without influencing the smoothing processing upon the character portion in the vicinity of the isolated pixels. On the other hand, since the non-isolated pixel data are edge-enhanced, the character portion, a line and the like show sharp and legible.

Although the foregoing has described the present invention in relation to the preferred embodiment above, the present invention is not limited to the preferred embodiment above. For example, while the preferred embodiment above requires that after separating the isolated pixel data, the isolated pixel data are smoothed out and the non-isolated pixel data are edge-enhanced, it is possible to obtain a sufficiently favorable image even without the edge enhancement.

Further, although the preferred embodiment has been described as a digital copier apparatus which comprises an image reader and a printer, it is possible to apply the invention only to an image reader. An image processing part approximately similar to that according to the preferred embodiment above may be disposed in an image reader, if one wishes to apply the invention only to an image reader.

Figure 5:
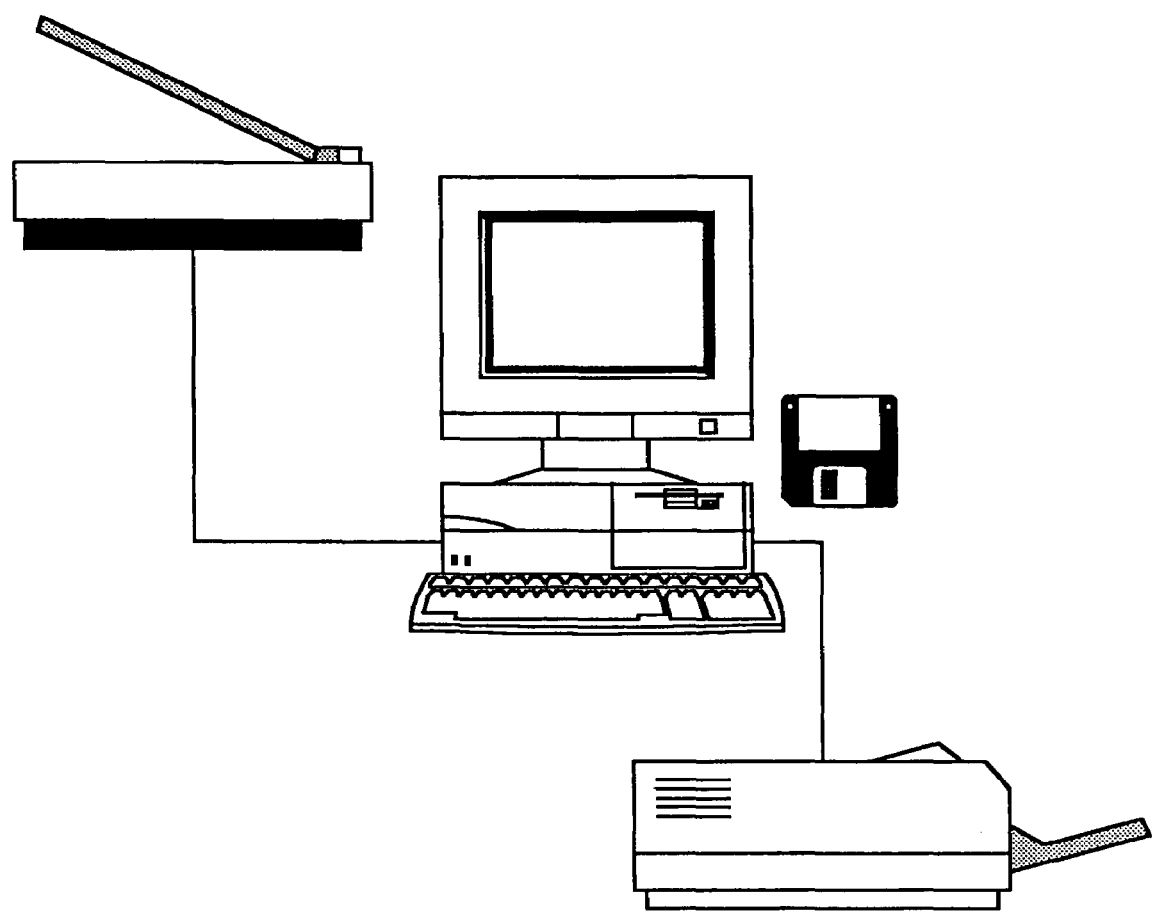
FIG. 5 is a schematic diagram of a system which is formed of an image reader, a printer and a computer.

Alternatively, use of computer software may realize the function of the image processing part described above. That is, as shown in FIG. 5, the image reader and the printer may be connected with each other via a computer, so that the computer processes image data outputted from the image reader and supplies the image data to the printer. In this case, the processing performed by the image processing part above is stored in a storage medium as a program, the program is installed in the computer from the storage medium, and the computer executes the program.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An image processing apparatus which processes image data obtained by reading a halftone dot image, said image processing apparatus comprising:
    a detector for detecting image data which correspond to isolated pixel data which form the halftone dot image;
    a separator for separating the image data into image data which correspond to isolated pixel data and non-isolated pixel data based on a result of the detection performed by said detector; and
    a smoothing processor for smoothing out only image data which correspond to the isolated pixel data;
    an edge enhancement processor for receiving and performing edge enhancement on only the non-isolated pixel data; and
    a synthesizer for synthesizing image data outputted from the smoothing processor and image data outputted from the edge enhancement processor.

2. An image processing apparatus as claimed in claim 1, further comprising an image reader for reading the halftone dot image to generate the image data.

3. An image processing apparatus as claimed in claim 1, wherein said detector detects image data which correspond to isolated pixels as the image data which correspond to the halftone dots.

4. An image processing method for processing image data which are obtained by reading a halftone dot image, said image processing method comprising steps of:
    detecting image data which correspond to isolated pixel data which form the halftone dot image;
    separating the image data into image data which correspond to isolated pixel data and non-isolated pixel data based on a result of the detection performed by said detecting step;
    smoothing out of only the image data which correspond to isolated pixel data;
    performing edge enhancement on only the non-isolated pixel data; and
    synthesizing image data outputted at said smoothing step and image data outputted at said edge enhancement step.

5. An image processing method as claimed in claim 4, wherein said step of detecting image data detects image data which correspond to isolated pixels as the image data which correspond to the halftone dots.

6. A computer program product stored in a computer readable medium for processing image data obtained by reading a halftone dot image, said computer program product comprising instructions to execute the following steps:
    a step of detection control for detecting image data which correspond to isolated pixel data which form the halftone dot image;
    a step of separation control for separating the image data into image data which correspond to isolated pixel data and non-isolated pixel data based on a result of the detection performed by the step of detection control;
    a step of smoothing control for smoothing out only the image data which correspond to the isolated pixel data;

a step of edge enhancement control for performing edge enhancement on only the non-isolated pixel data; and a step of synthesis control for synthesizing image data outputted from the step of smoothing control and image data outputted from the step of edge enhancement control.

7. A computer program product as claimed in claim 6, wherein said step of detection control detects image data which correspond to isolated pixels as the image data which correspond to the halftone dots.

* * * * *